US012784618B2

(12) United States Patent
Endo et al.

(10) Patent No.: US 12,784,618 B2
(45) Date of Patent: Nov. 3, 2026

(54) ADDITIVE MANUFACTURING MODEL ASSEMBLY

(71) Applicant: HONDA MOTOR CO., LTD., Tokyo (JP)

(72) Inventors: Tsuneo Endo, Saitama (JP); Yuta Kurosawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 590 days.

(21) Appl. No.: 18/367,299

(22) Filed: Sep. 12, 2023

(65) Prior Publication Data

US 2024/0127717 A1 Apr. 18, 2024

(30) Foreign Application Priority Data

Oct. 12, 2022 (JP) ................................ 2022-163785

(51) Int. Cl.
*G09B 25/02* (2006.01)
*B33Y 80/00* (2015.01)

(52) U.S. Cl.
CPC .............. *G09B 25/02* (2013.01); *B33Y 80/00* (2014.12)

(58) Field of Classification Search
CPC .......... B33Y 80/00; B33Y 10/00; G09B 25/02
See application file for complete search history.

(56) References Cited

U.S. PATENT DOCUMENTS 11,717,892 B1 * 8/2023 Carlson .................. B22F 7/062 419/6
2017/0089643 A1 * 3/2017 Arafat .................. F28D 9/0037
2018/0245853 A1 * 8/2018 Sennoun .................. F28C 3/04
2018/0345425 A1 12/2018 Caimano et al.
(Continued)

FOREIGN PATENT DOCUMENTS

JP H10-281687 A 10/1998
JP 2000-202523 A 7/2000
(Continued)

OTHER PUBLICATIONS

Aug. 5, 2025, Translation of Japanese Office Action issued for related JP application No. 2022-163785.

*Primary Examiner* — James S. McClellan
(74) *Attorney, Agent, or Firm* — Paratus Law Group, PLLC

(57) ABSTRACT

An additive manufacturing model assembly includes: an additive manufacturing model formed by additive manufacturing in which laminated metal powder is melted; and a metal non-additive manufacturing model formed by a method different from the additive manufacturing, the additive manufacturing model assembly is configured by assembling the additive manufacturing model and the non-additive manufacturing model, the additive manufacturing model assembly has: a contact portion at which the additive manufacturing model and the non-additive manufacturing model are in contact with each other; and a fixing portion by which the additive manufacturing model and the non-additive
(Continued)

manufacturing model are fixed to each other, the fixing portion being located at a same position as the contact portion or a position different from the contact portion, and a thickness of the additive manufacturing model is thinner than a thickness of the non-additive manufacturing model at the contact portion.

18 Claims, 13 Drawing Sheets

(56) References Cited

U.S. PATENT DOCUMENTS

| | | | | |
|---|---|---|---|---|
| 2020/0309459 | A1* | 10/2020 | Streeter | F28F 7/02 |
| 2021/0003349 | A1* | 1/2021 | Horoszczak | F28F 1/006 |
| 2021/0116188 | A1* | 4/2021 | Roper | F28F 9/0202 |
| 2021/0333056 | A1* | 10/2021 | Butcka | B33Y 40/20 |
| 2021/0381473 | A1 | 12/2021 | Endou et al. | |
| 2022/0290924 | A1 | 9/2022 | Eguchi et al. | |
| 2022/0307775 | A1 | 9/2022 | Endo et al. | |
| 2023/0076321 | A1* | 3/2023 | Saviers | F28D 1/0443 |
| 2024/0043335 | A1* | 2/2024 | Dorfner | B22F 10/64 |

FOREIGN PATENT DOCUMENTS

| | | | |
|---|---|---|---|
| JP | 2002-295990 | A | 10/2002 |
| JP | 2010-209878 | A | 9/2010 |
| JP | 2019-027772 | A | 2/2019 |
| JP | 2019-138553 | A | 8/2019 |
| JP | 2021-038894 | A | 3/2021 |
| JP | 2021-188872 | A | 12/2021 |
| JP | 2022-150714 | A | 10/2022 |
| WO | WO 2020/217601 | A1 | 10/2020 |

* cited by examiner

ADDITIVE MANUFACTURING MODEL ASSEMBLY

CROSS REFERENCE TO RELATED APPLICATION

This application is based on and claims priority under 35 USC 119 from Japanese Patent Application No. 2022-163785 filed on Oct. 12, 2022, which is hereby incorporated by reference in its entirety.

TECHNICAL FIELD

The present invention relates to an additive manufacturing model assembly configured by assembling an additive manufacturing model formed by additive manufacturing, and a non-additive manufacturing model formed by a method different from additive manufacturing.

BACKGROUND ART

An additive manufacturing technology (hereinafter, referred to as AM technology) capable of manufacturing a component having a complicated three-dimensional shape by laminating and solidifying a predetermined material (for example, a metal) in layers has been known. According to AM technology, it is possible to manufacture a component having a fine and complicated three-dimensional shape, which is difficult to manufacture by a manufacturing method such as machining or casting, and the improvement in performance of the component can be expected.

For example, JP2019-27772A describes that by using additive manufacturing technology to form a heat exchanger as a monolithic component, a manufacturing time and cost can be reduced compared with a conventional method in which each of a plurality of components is positioned, directed, joined, and assembled by brazing, welding, or the like. However, since a powder material is laminated and molded in layers according to AM technology, the number of times of lamination increases, and thus the manufacturing cost may increase. It is desired to reduce the manufacturing cost while enjoying the advantages of AM technology when a component is manufactured by AM technology.

JP2021-188872A describes that by forming a heat exchanger according to metal additive manufacturing, it is possible to achieve a reduction in size and weight while ensuring sufficient heat transfer performance and rigidity strength. In addition, it is suggested that only a heat exchanger body may be integrally formed according to metal additive manufacturing, and a gas pipeline and a cooling water pipeline each of which is separately manufactured from the heat exchanger body may be fixed to the heat exchanger body.

SUMMARY OF INVENTION

However, JP2021-188872A also does not specifically describe an additive manufacturing model assembly configured by assembling an additive manufacturing model formed by additive manufacturing, and a non-additive manufacturing model formed by a method different from additive manufacturing, and there is room for the improvement in manufacturing cost of the additive manufacturing model assembly. Although AM technology (additive manufacturing) can manufacture a component having a fine and complicated three-dimensional shape as described above, as a volume thereof increases, an added value achieved by AM technology and a reduction in cost are not compatible. On the other hand, although the component having a fine and complicated three-dimensional shape cannot be manufactured according to the conventional manufacturing method such as machining or casting, even a component having a large volume can be manufactured at a low cost.

The invention provides an additive manufacturing model assembly that can be manufactured at a low cost while enjoying the advantages of additive manufacturing technology.

An aspect of the invention provides an additive manufacturing model assembly, the additive manufacturing model assembly includes:

an additive manufacturing model formed by additive manufacturing in which laminated metal powder is melted; and a metal non-additive manufacturing model formed by a method different from the additive manufacturing, the additive manufacturing model assembly is configured by assembling the additive manufacturing model and the non-additive manufacturing model, the additive manufacturing model assembly has:

a contact portion at which the additive manufacturing model and the non-additive manufacturing model are in contact with each other; and a fixing portion by which the additive manufacturing model and the non-additive manufacturing model are fixed to each other, the fixing portion being located at the same position as the contact portion or a position different from the contact portion, and a thickness of the additive manufacturing model at the contact portion is thinner than a thickness of the non-additive manufacturing model at the contact portion.

According to the aspect of the invention, it is possible to manufacture an additive manufacturing model assembly at a low cost while enjoying the advantages of additive manufacturing technology.

BRIEF DESCRIPTION OF DRAWINGS

FIGS. 7A and 7B each illustrate an enlarged structure of one tubular partition wall W3, in which FIG. 7A is a perspective view of the tubular partition wall W3, and FIG. 7B is a cross-sectional view taken along a line C-C in FIG. 7A and a transverse cross-sectional view of main parts;

FIG. 8A is a transverse cross-sectional view of a middle part W3*m* of the tubular partition wall W3, and FIG. 8B is an area comparison diagram illustrating a relation between cross-sectional areas of the middle part W3*m* and both end parts W3*a*, W3*b* of the tubular partition wall W3;

DETAILED DESCRIPTION OF THE INVENTION

Hereinafter, an embodiment of an additive manufacturing model assembly according to the invention will be described with reference to the accompanying drawings by taking a case where the additive manufacturing model assembly is a heat exchanger as an example.

Figure 1:
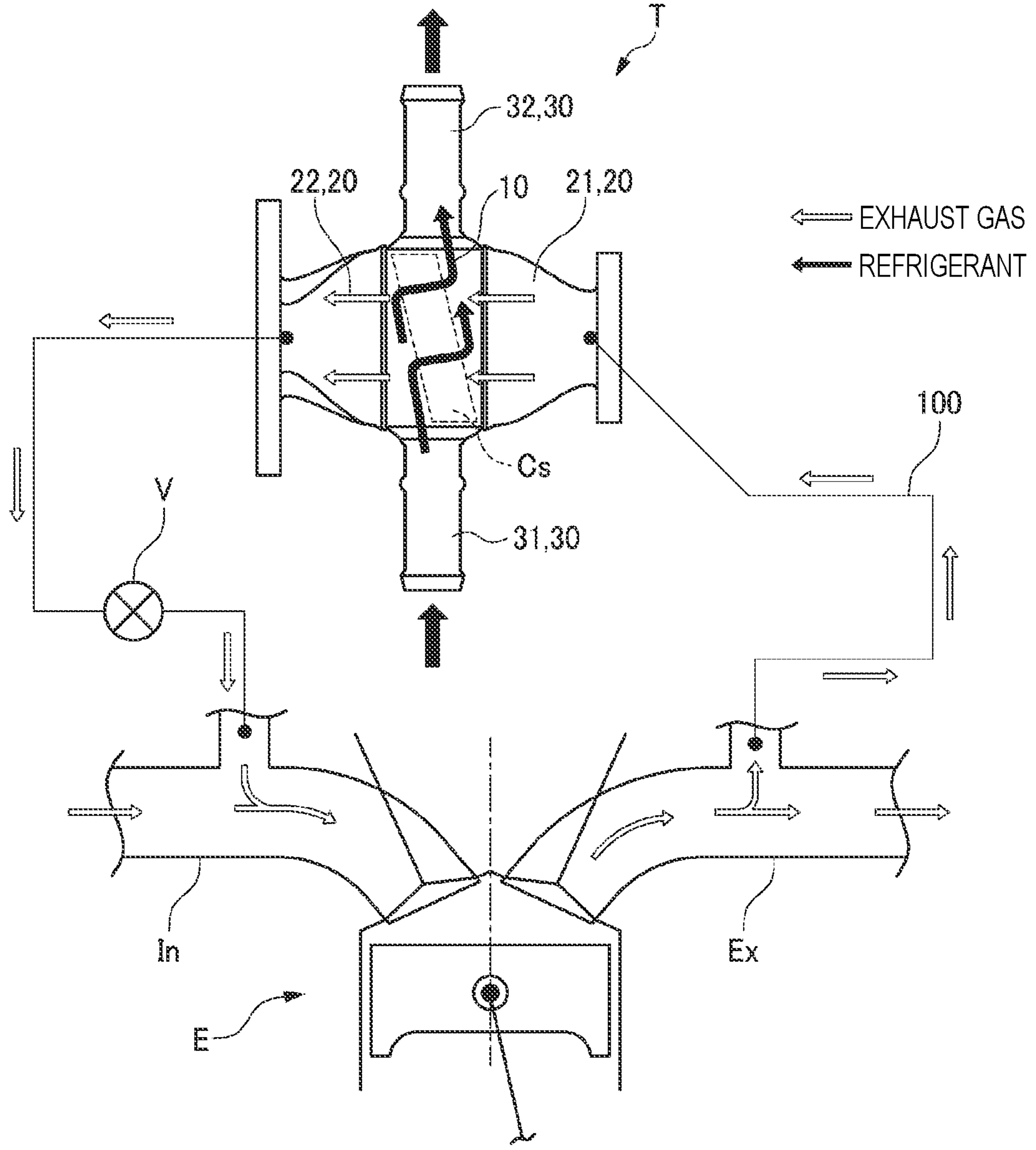
FIG. 1 is a diagram illustrating a heat exchanger T that is an additive manufacturing model assembly according to an embodiment of the invention, and illustrates an example in which the heat exchanger T is used for cooling an EGR gas for an internal combustion engine.

As illustrated in FIG. 1, a heat exchanger T, which is an additive manufacturing model assembly, is an exhaust gas recirculation (EGR) cooler used for cooling an EGR gas for an internal combustion engine E mounted on a vehicle (for example, an automobile). Hereinafter, the EGR gas is simply referred to as an exhaust gas. The internal combustion engine E includes an exhaust gas recirculation device R that circulates a part of the exhaust gas in an exhaust pipe Ex to an intake pipe In in accordance with a driving situation. The exhaust gas recirculation device R includes an exhaust gas recirculation path 100 connected between the inside of the exhaust pipe Ex and the inside of the intake pipe In. The heat exchanger T for cooling the recirculated exhaust gas and a control valve V for controlling a flow rate of the exhaust gas are provided in series in the middle of the exhaust gas recirculation path 100. When the control valve V is opened during an operation of the internal combustion engine E, a part of the exhaust gas in the exhaust pipe Ex flows toward the intake pipe In through the exhaust gas recirculation path 100, and is cooled in the heat exchanger T.

Figure 2:
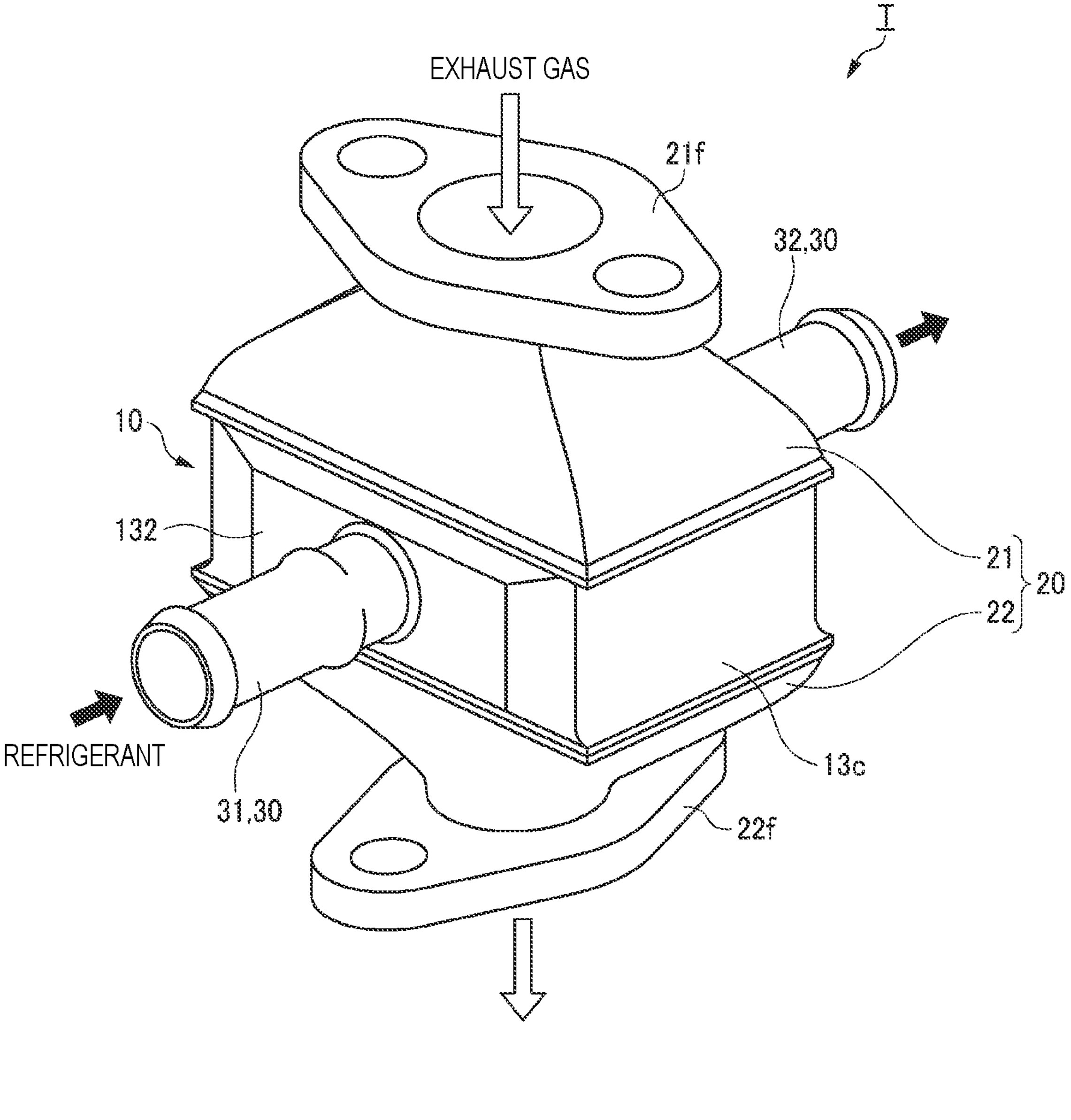
FIG. 2 is a perspective view of the heat exchanger T.
Figure 3:
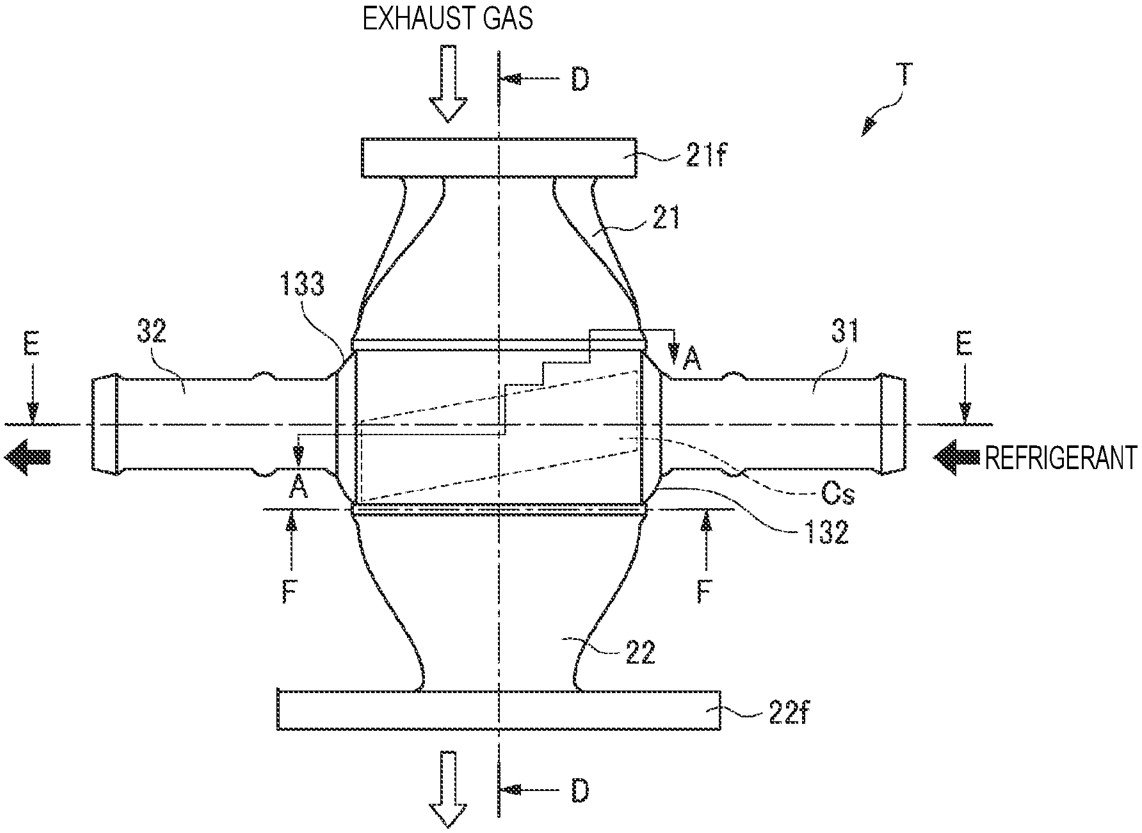
FIG. 3 is a side view of the heat exchanger T.

As illustrated in FIGS. 1 to 3, the heat exchanger T includes an exhaust gas pipeline 20, a refrigerant pipeline 30, and a heat exchange portion 10. The exhaust gas pipeline 20 constitutes a part of the exhaust gas recirculation path 100 and allows the exhaust gas to flow therethrough. The refrigerant pipeline 30 constitutes a part of a refrigerant circulation path (not shown) through which a refrigerant (for example, a cooling water) circulates, and allows the refrigerant to flow therethrough. The heat exchange portion 10 has a substantially rectangular parallelepiped shape, and is configured to exchange heat between the exhaust gas in the exhaust gas pipeline 20 and the refrigerant in the refrigerant pipeline 30 therein. Although details will be described later, as illustrated in FIGS. 4 to 8, a large number of first flow paths L1 each of which communicates with the exhaust gas pipeline 20 and allows the exhaust gas to flow therethrough and a large number of second flow paths L2 each of which communicates with the refrigerant pipeline 30 and allows the refrigerant to flow therethrough are provided inside the heat exchange portion 10.

(Exhaust Gas Pipeline)

Figure 9:
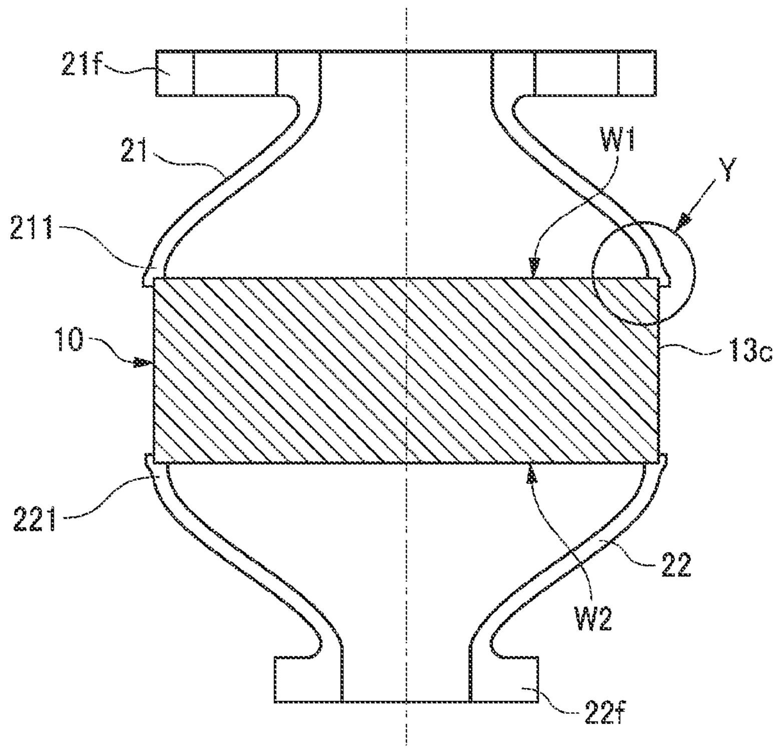
FIG. 9 is a cross-sectional view taken along a line D-D in FIG. 3.

As illustrated in FIGS. 2, 3, and 9, the exhaust gas pipeline 20 includes an upstream-side gas pipeline 21 that introduces the exhaust gas into the heat exchange portion 10, and a downstream-side gas pipeline 22 that allows the exhaust gas introduced into the heat exchange portion 10 to flow out from the heat exchange portion 10. The upstream-side gas pipeline 21 is provided on an upstream side of the heat exchange portion 10 in the exhaust gas recirculation path 100 and communicates with the exhaust pipe Ex. The downstream-side gas pipeline 22 is provided on a downstream side of the heat exchange portion 10 in the exhaust gas recirculation path 100 and communicates with the intake pipe In.

The upstream-side gas pipeline 21 and the downstream-side gas pipeline 22 are in contact with and fixed to the heat exchange portion 10. Further, the upstream-side gas pipeline 21 and the downstream-side gas pipeline 22 are integrally provided with connection flange portions **21*f* and 22*f*, respectively, on sides opposite to connection end portions 211 and 221 (see FIG. 9) that are connection positions with the heat exchange portion 10 in a flow direction of the exhaust gas (an upper-lower direction in FIGS. 3 and 9). Each of the connection flange portions 21*f* and 22*f* is connected to a pipeline (not shown) of the exhaust gas recirculation path 100**.

Figure 11:
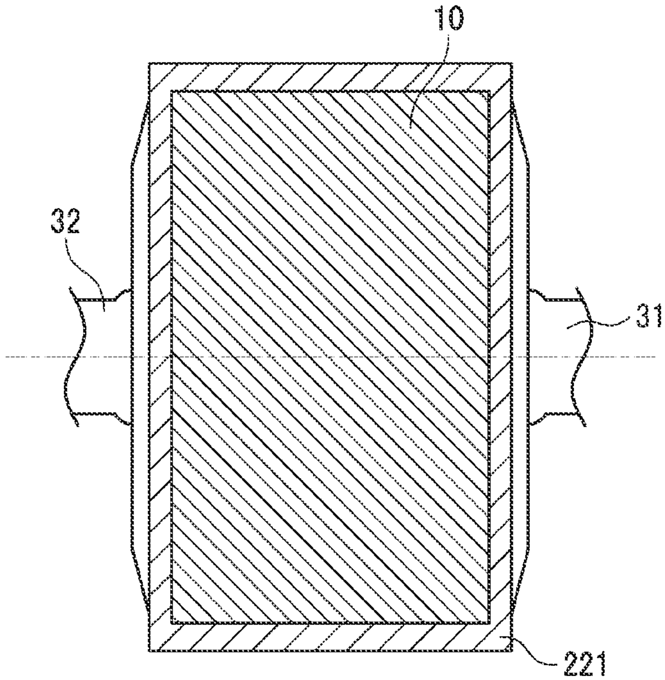
FIG. 11 is a cross-sectional view taken along a line F-F in FIG. 3.

The upstream-side gas pipeline 21 and the downstream-side gas pipeline 22 have a substantially rectangular flow path section orthogonal to the flow direction of the exhaust gas at the connection end portions 211 and 221, respectively (see FIG. 11), and are in contact with the heat exchange portion 10 having a substantially rectangular parallelepiped shape. The flow path sections of the upstream-side gas pipeline 21 and the downstream-side gas pipeline 22 become larger from the connection flange portions **21*f* and 22*f* toward the connection end portions 211 and 221, respectively. Further, the flow path sections of the upstream-side gas pipeline 21 and the downstream-side gas pipeline 22 continuously change from a circular section to a substantially rectangular section from the connection flange portions 21*f* and 22*f* toward the connection end portions 211 and 221, respectively. The upstream-side gas pipeline 21 and the downstream-side gas pipeline 22** are not limited to the shapes, and may be in any shape.

(Refrigerant Pipeline)

Figure 12:
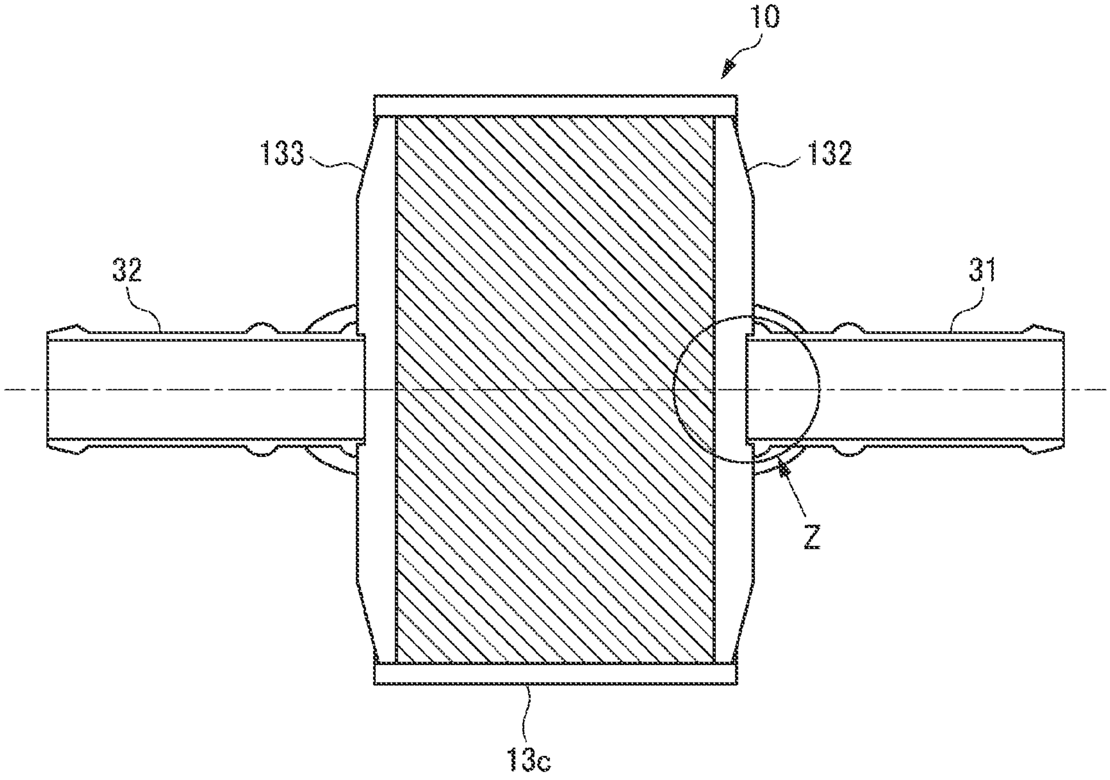
FIG. 12 is a cross-sectional view taken along a line E-E in FIG. 3.

As illustrated in FIGS. 2, 3, and 12, the refrigerant pipeline 30 includes a refrigerant inflow pipeline 31 that introduces the refrigerant into the heat exchange portion 10, and a refrigerant outflow pipeline 32 that allows the refrigerant introduced into the heat exchange portion 10 to flow out. The refrigerant inflow pipeline 31 and the refrigerant outflow pipeline 32 are in contact with and fixed to side portions of the heat exchange portion 10, respectively. Specifically, the refrigerant inflow pipeline 31 and the refrigerant outflow pipeline 32 are in contact with and fixed to refrigerant pipeline attaching walls 132 and 133 (to be described later) of the heat exchange portion 10, respectively. In the present embodiment, both the refrigerant inflow pipeline 31 and the refrigerant outflow pipeline 32 have a cylindrical shape, but the invention is not limited thereto, the refrigerant inflow pipeline 31 and the refrigerant outflow pipeline 32 may have a rectangular tube shape, and may be in any shape.

When volumes of the exhaust gas pipeline 20 and the refrigerant pipeline 30 (here, the volume refers to a solid portion of each pipeline, and does not include a flow path portion) are compared, the volume of the exhaust gas pipeline 20 is larger than the volume of the refrigerant pipeline 30. Therefore, when the exhaust gas pipeline 20 and the refrigerant pipeline 30 are formed of the same material, the weight of the exhaust gas pipeline 20 is larger than that of the refrigerant pipeline 30. In addition, when flow path cross-sectional areas of the exhaust gas pipeline 20 and the refrigerant pipeline 30 are compared, the flow path cross-sectional area of the exhaust gas pipeline 20 is larger than that of the refrigerant pipeline 30. Accordingly, the flow rate of the exhaust gas flowing through the exhaust gas pipeline 20 is higher than the flow rate of the refrigerant flowing through the refrigerant pipeline 30, that is, a large amount of the exhaust gas can be allowed to flow through the exhaust gas pipeline 20.

(Heat Exchange Portion)

As illustrated in FIGS. 2, 3, and 9, for example, the heat exchange portion 10 integrally includes a case tube 13*c* having a substantially rectangular tube shape, an upstream end plate W1 that closes one end of the case tube 13*c* and is located at a downstream end of the upstream-side gas pipeline 21, and a downstream end plate W2 that closes the other end of the case tube 13*c* and is located at an upstream end of the downstream-side gas pipeline 22. The refrigerant pipeline attaching walls 132 and 133 to which the refrigerant inflow pipeline 31 and the refrigerant outflow pipeline 32 are respectively fixed are provided on side portions of the case tube 13*c*, in other words, the heat exchange portion 10 also integrally includes the refrigerant pipeline attaching walls 132 and 133.

As illustrated in FIGS. 4 to 8, a large number of the first flow paths L1 and a large number of the second flow paths L2 are provided inside the heat exchange portion 10. The first flow paths L1 allow the upstream-side gas pipeline 21 and the downstream-side gas pipeline 22 to communicate with each other in parallel. The second flow paths L2 are arranged adjacent to the first flow paths L1 via a partition wall W (to be described later), and allow the refrigerant inflow pipeline 31 and the refrigerant outflow pipeline 32 to communicate with each other in parallel.

The exhaust gas flowing through the exhaust gas recirculation path 100 can flow through the first flow paths L1. The refrigerant introduced from the refrigerant inflow pipeline 31 can flow through the second flow paths L2. Therefore, the exhaust gas flowing in the first flow paths L1 and the refrigerant flowing in the second flow paths L2 exchange heat via the partition wall W interposed therebetween, and the exhaust gas is cooled thereby.

The partition wall W includes the upstream end plate W1 and the downstream end plate W2 described above, and a large number of tubular partition walls W3. The upstream end plate W1 functions as a partition wall portion located on an upstream end side of the heat exchange portion 10 in the flow direction of the exhaust gas. The downstream end plate W2 functions as a partition wall portion located on a downstream end side of the heat exchange portion 10 in the flow direction of the exhaust gas. The tubular partition walls W3 are accommodated in the case tube 13*c* and are integrally coupled between the upstream end plate W1 and the downstream end plate W2. An upper end W3*a* and a lower end W3*b* of each tubular partition wall W3 pass through the upstream end plate W1 and the downstream end plate W2, and are directly opened in the upstream-side gas pipeline 21 and the downstream-side gas pipeline 22, respectively.

Figure 6:
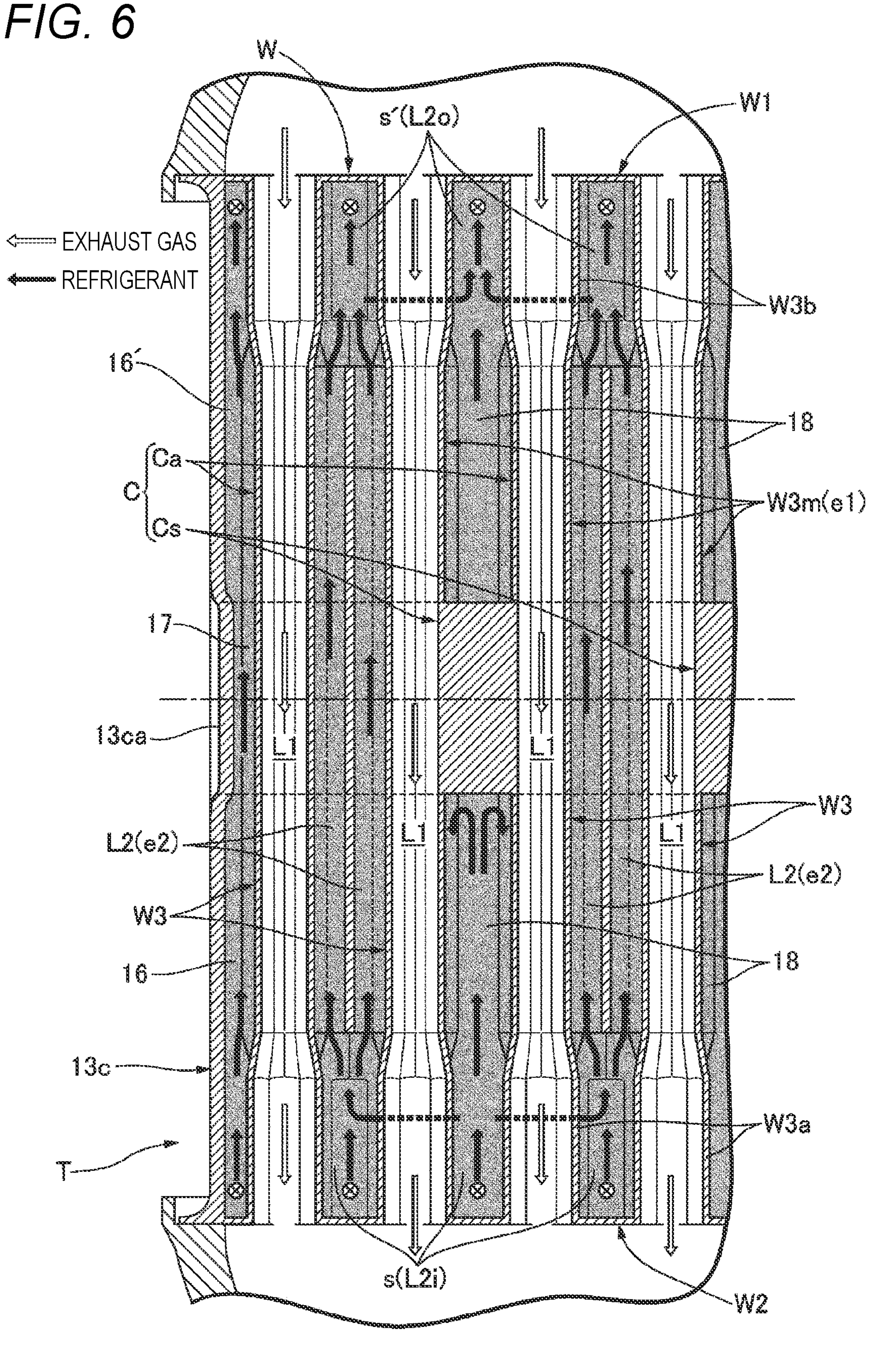
FIG. 6 is a cross-sectional view taken along a line B-B in FIG. 5.
Figure 7A:
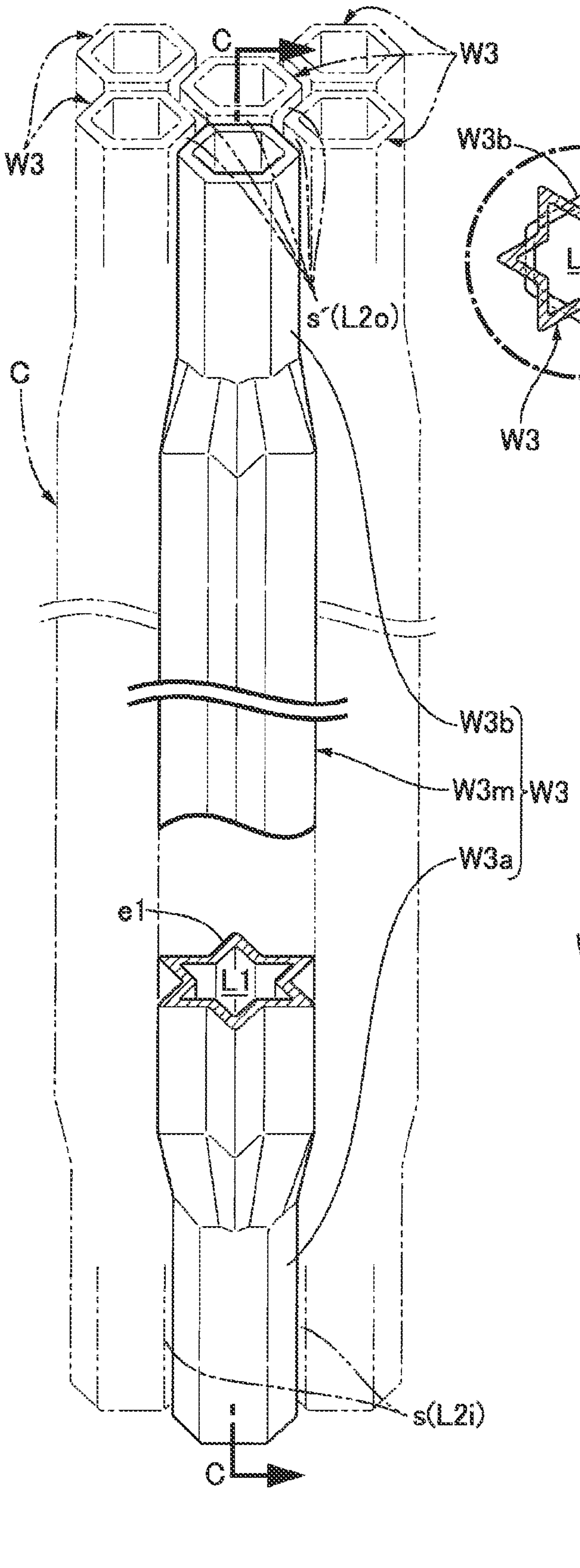
Figure 7B:
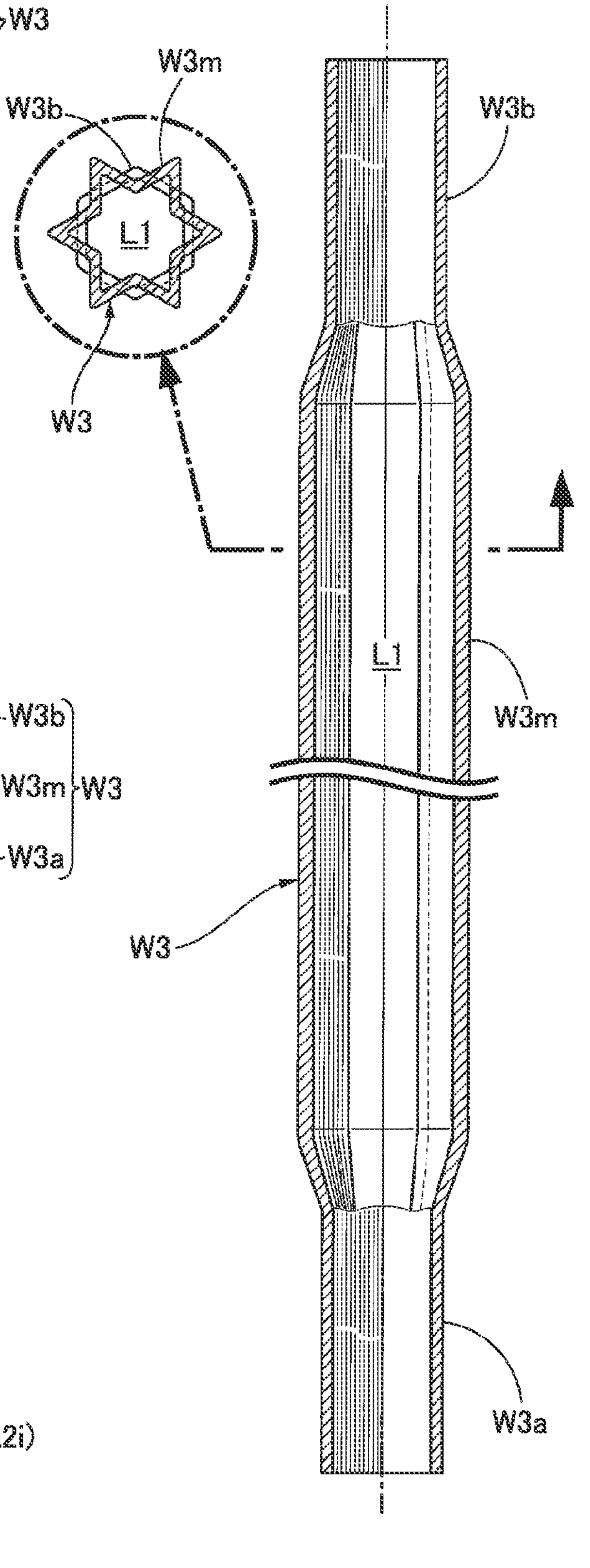

As illustrated in FIGS. 6 and 7, the tubular partition walls W3 extend linearly to be orthogonal to the upstream end plate W1 and the downstream end plate W2. In other words, the tubular partition walls W3 extend linearly along the flow direction of the exhaust gas. An internal space of each tubular partition wall W3 constitutes one of the first flow paths L1.

Figure 4:
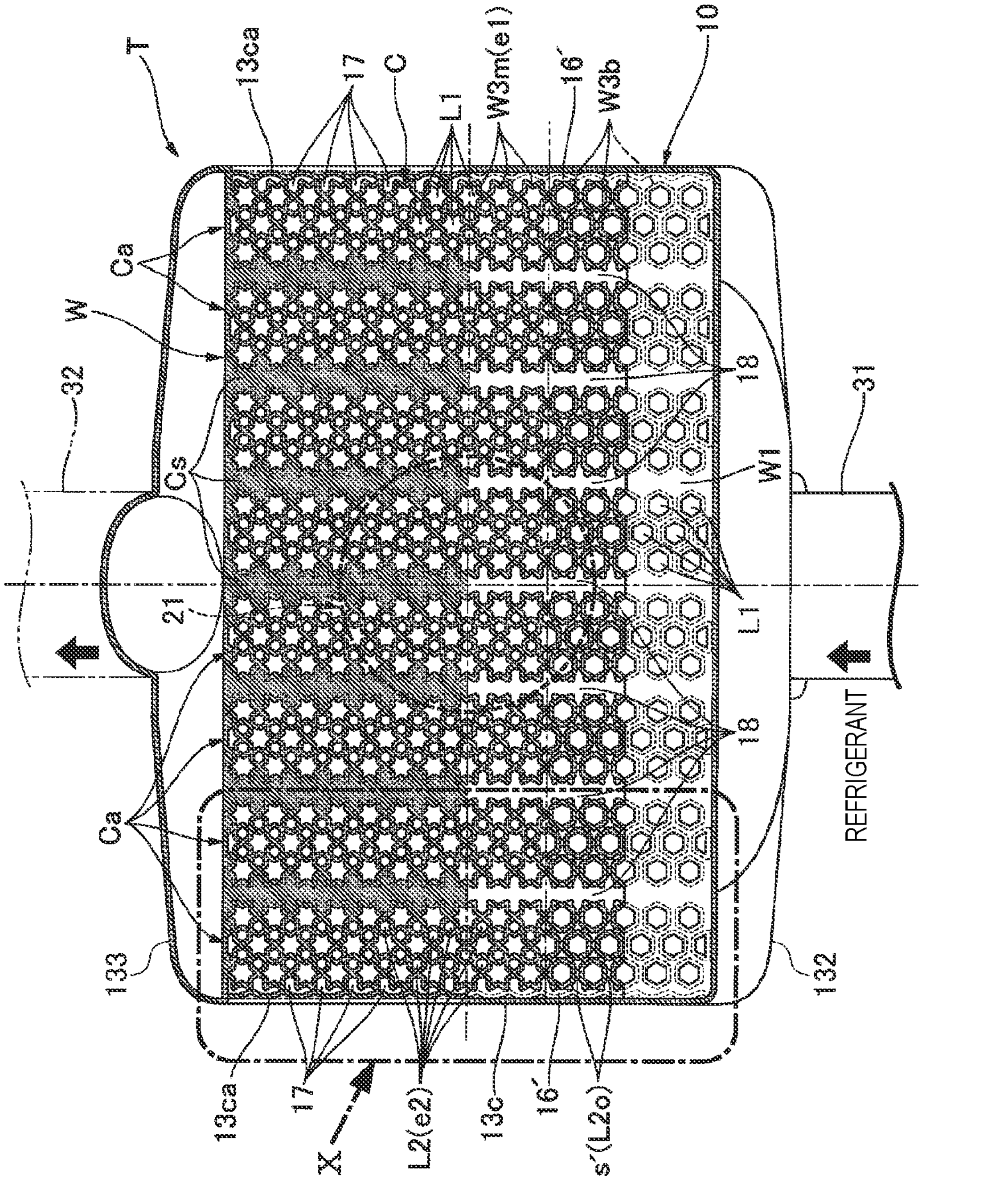
FIG. 4 is a cross-sectional view taken along a line A-A in FIG. 3, and illustrates transverse cross-sectional shapes of first flow paths L1 and second flow paths L2 formed in a heat exchange portion 10.
Figure 5:
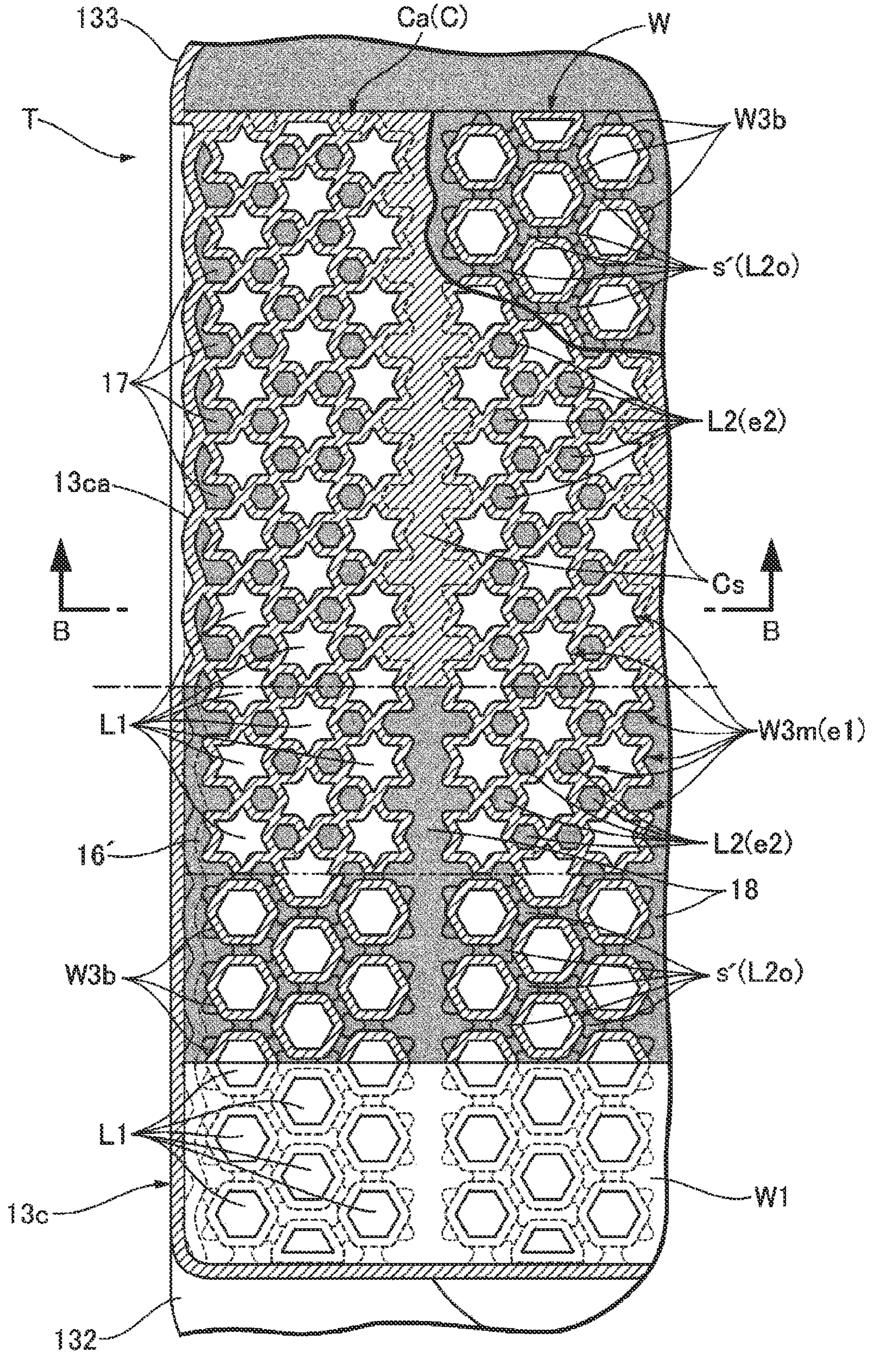
FIG. 5 is an enlarged cross-sectional view of a portion X in FIG. 4.

At least a part of each tubular partition wall W3 in an extension direction of the first flow paths L1 (the upper-lower direction in FIGS. 6 and 7) is formed into a star-shaped section. In the present embodiment, as illustrated in FIGS. 4, 5, and 7, a middle part W3*m* (a part excluding both end parts W3*a* and W3*b*) of each tubular partition wall W3 in the extension direction of the first flow paths L1 is formed into a star-shaped section. The middle parts W3*m* of the tubular partition walls W3 are integrally coupled to each other, and constitute partition wall coupling portions C each having a transverse cross section that forms a geometric pattern. As illustrated in FIGS. 4 and 5, element graphics of the geometric pattern include star-shaped element graphics e1 each corresponding to the transverse cross-sectional shape of the middle part W3*m* of each tubular partition wall W3, and hexagon-shaped element graphics e2 each surrounded by a plurality of the star-shaped element graphics e1.

The geometric pattern described above is implemented by a geometric pattern in which the element graphics, for example, the star-shaped element graphics e1 are connected to each other at vertices thereof, and the number of sides of the star-shaped element graphics e1 collected at each of the vertices is an even number (four in the illustrated example).

In each partition wall coupling portion C of the middle parts W3*m* of the tubular partition walls W3, a transverse cross section of each second flow path L2 is defined to a hexagon shape (that is, corresponding to the hexagon-shaped element graphic e2) between outer peripheral surfaces of star-shaped cross-sectional portions (the middle parts W3*m*) of the several tubular partition walls W3 surrounding the second flow path L2. Moreover, in the partition wall coupling portion C, the plurality of first flow paths L1 and the plurality of second flow paths L2 extend linearly in parallel with and adjacent to each other.

In each tubular partition wall W3, transverse cross sections of the upper end W3*a* and the lower end W3*b* are formed into a hexagon shape. The first flow path L1, which is the internal space of each tubular partition wall W3, is formed such that a shape of the flow path section gradually and smoothly changes from the star-shaped cross-sectional portion (the middle part W3*m*) to hexagon-shaped cross-sectional portions (the upper end W3*a* and the lower end W3*b*) from the upper end W3*a* to the middle part W3*m* and from the lower end W3*b* to the middle part W3*m*.

Figure 8A:
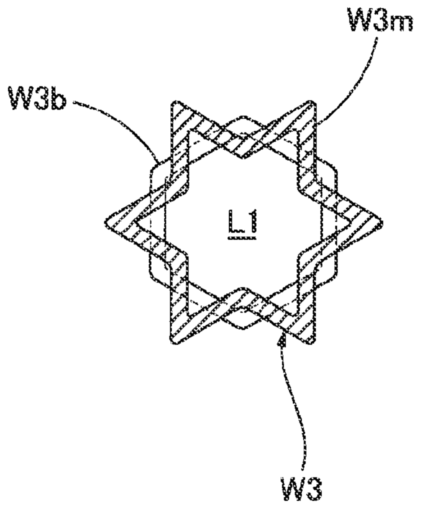
FIGS. 8A and 8B are each a diagram illustrating a transverse cross section of the tubular partition wall W3.
Figure 8B:
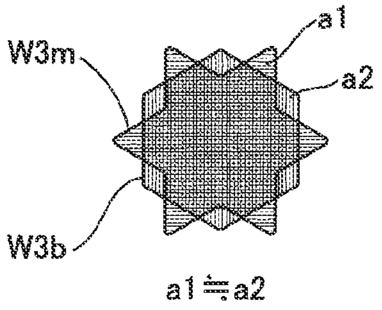

In this case, a flow path cross-sectional area of each tubular partition wall W3 (the first flow path L1) is set to be substantially the same at the star-shaped cross-sectional portion and the hexagon-shaped cross-sectional portion as illustrated in FIG. 8. In other words, regarding the star-shaped cross-sectional portion (the middle part W3*m*) and the hexagon-shaped cross-sectional portions (the upper end W3*a* and the lower end W3*b*) of each tubular partition wall W3, cross-sectional areas of parts that do not overlap each other when viewed in a projection plane orthogonal to each tubular partition wall W3 are substantially the same, that is, $a1 \approx a2$.

According to the change in the shape of the flow path section of each tubular partition wall W3 as described above, first gaps s and second gaps s' in a direction orthogonal to a flow path direction of the first flow paths L1 are formed between the outer peripheral surfaces of the hexagon-shaped cross-sectional portions at the upper ends W3*a* and the lower ends W3*b* of the adjacent tubular partition walls W3.

In the heat exchange portion 10, as illustrated in FIGS. 4 to 7, each second gap s' is deployed in a hexagonal mesh shape, constitutes an outlet space L2_o_ of the second flow path L2, and communicates with the refrigerant outflow pipeline 32. On the other hand, in the heat exchange portion 10, as illustrated in FIGS. 4 to 7, each first gap s is developed in the same hexagonal mesh shape as that of each second gap s', constitutes an inlet space L2_i_ of the second flow path L2, and communicates with the refrigerant inflow pipeline 31. More specifically, spaces are formed between the refrigerant pipeline attaching wall 132 and each first gap s (the inlet space L2_i_) and between the refrigerant pipeline attaching wall 133 and each second gap s' (the outlet space L2_o_) (see FIG. 12), and each first gap s and each second gap s' communicate with the refrigerant inflow pipeline 31 and the refrigerant outflow pipeline 32, respectively, via the spaces.

However, as illustrated in FIGS. 4 and 5, each partition wall coupling portion C according to the present embodiment is divided into a plurality of partition wall coupling portion elements Ca, and flat small gaps 18 are provided between the adjacent partition wall coupling portion elements Ca. In addition, as illustrated in FIGS. 1 and 3 to 6, the adjacent partition wall coupling portion elements Ca are integrally coupled to each other via a closing wall portion Cs that fills a part of the small gaps 18 at the middle parts of the tubular partition walls W3 in the extension direction. The closing wall portion Cs functions as a blocking wall that blocks communication (that is, short-circuit) via the small gaps 18 between the inlet spaces L2_i_ and the outlet spaces L2_o_.

As illustrated in FIG. 1, the closing wall portion Cs according to the present embodiment is arranged to be inclined toward a direction (the upper-lower direction in FIG. 1) orthogonal to the extension direction of the second flow paths L2. Due to such an arrangement of the closing wall portion Cs, each inlet space L2_i_ becomes wider as a width of each second flow path L2 in the extension direction is closer to the refrigerant inflow pipeline 31, and each outlet space L2_o_ becomes wider as the width is closer to the refrigerant outflow pipeline 32. Since an opening between the refrigerant inflow pipeline 31 and the inlet spaces L2_i_ is wide, the refrigerant easily flows smoothly from the refrigerant inflow pipeline 31 into the inlet spaces L2_i_, and further, since an opening between the outlet spaces L2_o_ and the refrigerant outflow pipeline 32 is wide, the refrigerant easily flows out smoothly from the outlet spaces L2_o_ to the refrigerant outflow pipeline 32.

As illustrated in FIGS. 4 to 6, first flat water passages 16 and second flat water passages 16' communicating with the first gaps s and the second gaps s', respectively, are provided between a group of the outermost tubular partition walls W3 in the plurality of partition wall coupling portion elements Ca and the case tube 13_c_ covering outer side surfaces of the group of the tubular partition walls W3. Each first flat water passage 16 and each second flat water passage 16' also function as parts of the inlet space L2_i_ and the outlet space L2_o_, respectively.

A strip-shaped corrugated plate portion 13_ca_, which is formed to be curved in a wave shape in a transverse cross section, is formed at a part of the case tube 13_c_, in particular, a part corresponding to the closing wall portion Cs. As illustrated in FIG. 5, the strip-shaped corrugated plate portion 13_ca_ is close to the outermost tubular partition walls W3, and a part of the strip-shaped corrugated plate portion 13_ca_ is integrally connected to the tubular partition walls W3. Between the strip-shaped corrugated plate portion 13_ca_ and the middle parts W3_m_ (the star-shaped cross-sectional portions) of the outermost tubular partition walls W3, a plurality of irregular water passages 17 each having a flow path section narrower than the first flat water passage 16 and the second flat water passage 16' are provided in parallel to each other. Each irregular water passage 17 communicates with the first flat water passage 16 and the second flat water passage 16', and functions as a refrigerant flow path similarly to a middle part (a hexagon-shaped cross-sectional portion) of the second flow path L2.

The strip-shaped corrugated plate portion 13_ca_ is formed to overlap the closing wall portion Cs (that is, to be inclined similarly to the closing wall portion Cs) in a side view of the case tube 13_c_ (that is, FIG. 3). Further, instead of forming the irregular water passages 17, the water passage may be integrally filled with the closing wall portion Cs.

(Additive Manufacturing Model Assembly)

Next, a method for manufacturing the heat exchanger T as the embodiment of the additive manufacturing model assembly according to the invention will be described. Specifically, methods for forming the heat exchange portion 10, the exhaust gas pipeline 20, and the refrigerant pipeline 30 described above that constitute the heat exchanger T, and an assembling method thereof will be described.

The heat exchange portion 10 according to the present embodiment is an additive manufacturing model formed by metal additive manufacturing for melting laminated metal powder. Metal additive manufacturing (hereinafter, also simply referred to as additive manufacturing) is a forming technology for manufacturing a metal component by dissolving a metal powder using an electron beam or a fiber laser and then laminating and solidifying the obtained product, and is known as additive manufacturing technology (AM technology). During additive manufacturing, the heat exchange portion 10 is formed by laminating the metal powder in layers and melting the metal powder from the lower side to the upper side in FIG. 2 with the downstream end plate W2 of the partition wall W as a bottom surface. The phrase "with the downstream end plate W2 . . . as a bottom surface" means that the downstream end plate W2 is disposed on a base plate of an additive manufacturing apparatus (not illustrated) during additive manufacturing. Hereinafter, the direction (the upper-lower direction) in which the metal powder is laminated is also referred to as the lamination direction.

Additive manufacturing is suitable for manufacturing a component having a fine and complicated three-dimensional shape, which is difficult to manufacture by the conventional manufacturing method such as machining or casting. Such a fine and complicated three-dimensional shape often improves the performance of the component, that is, the improvement in the performance of the component can be expected by additive manufacturing. The heat exchange portion 10 has a transverse cross section having the geometric pattern as described above, and has a fine and complicated three-dimensional shape. In the present embodiment, such a heat exchange portion 10 is integrally formed, by additive manufacturing, including the case tube 13_c_ and the refrigerant pipeline attaching walls 132 and 133. Accordingly, the improvement in heat exchange efficiency of the heat exchange portion 10 (the heat exchanger T) can be expected as compared with a heat exchange portion formed by machining or casting.

On the other hand, according to additive manufacturing, the number of times of lamination increases, and thus the manufacturing cost may increase. In particular, in a case where the volume of the component is large, when the component is manufactured by additive manufacturing, the increase in manufacturing cost is remarkable. Therefore, when the component can be manufactured by a method different from additive manufacturing such as machining or casting, the manufacturing cost can be reduced by manufacturing the component using the method.

Thus, in the present embodiment, a part of the components constituting the heat exchanger T is formed using a method (for example, machining or casting) different from additive manufacturing. Specifically, the exhaust gas pipeline 20 and the refrigerant pipeline 30 are metal non-additive manufacturing models formed by a method different from additive manufacturing. That is, the heat exchanger T is not integrally manufactured by additive manufacturing in its entirety, and is configured by assembling the heat exchange portion 10 which is an additive manufacturing model, and the exhaust gas pipeline 20 and the refrigerant pipeline 30 which are non-additive manufacturing models.

Here, the heat exchange portion 10 and the exhaust gas pipeline 20 are assembled by bringing the heat exchange portion 10 and the exhaust gas pipeline 20 into contact with each other and fixing the heat exchange portion 10 and the exhaust gas pipeline 20 at a contact position. The heat exchange portion 10 and the refrigerant pipeline 30 are assembled by bringing the heat exchange portion 10 and the refrigerant pipeline 30 into contact with each other and fixing the heat exchange portion 10 and the refrigerant pipeline 30 at a position different from the contact position. Hereinafter, a contact portion 40A and a fixing portion 50A for the heat exchange portion 10 and the exhaust gas pipeline 20, and a contact portion 40B and a fixing portion 50B for the heat exchange portion 10 and the refrigerant pipeline 30 will be described in detail.

First, the contact portion 40A and the fixing portion 50A for the heat exchange portion 10 and the exhaust gas pipeline 20 (the upstream-side gas pipeline 21 and the downstream-side gas pipeline 22) will be described with reference to FIGS. 9 and 10. A contact portion and a fixing portion for the heat exchange portion 10 and the downstream-side gas pipeline 22 have structures similar to those of the contact portion 40A and the fixing portion 50A for the heat exchange portion 10 and the upstream-side gas pipeline 21, and therefore, hereinafter, only structures of the contact portion 40A and the fixing portion 50A for the heat exchange portion 10 and the upstream-side gas pipeline 21 will be described.

Figure 10:
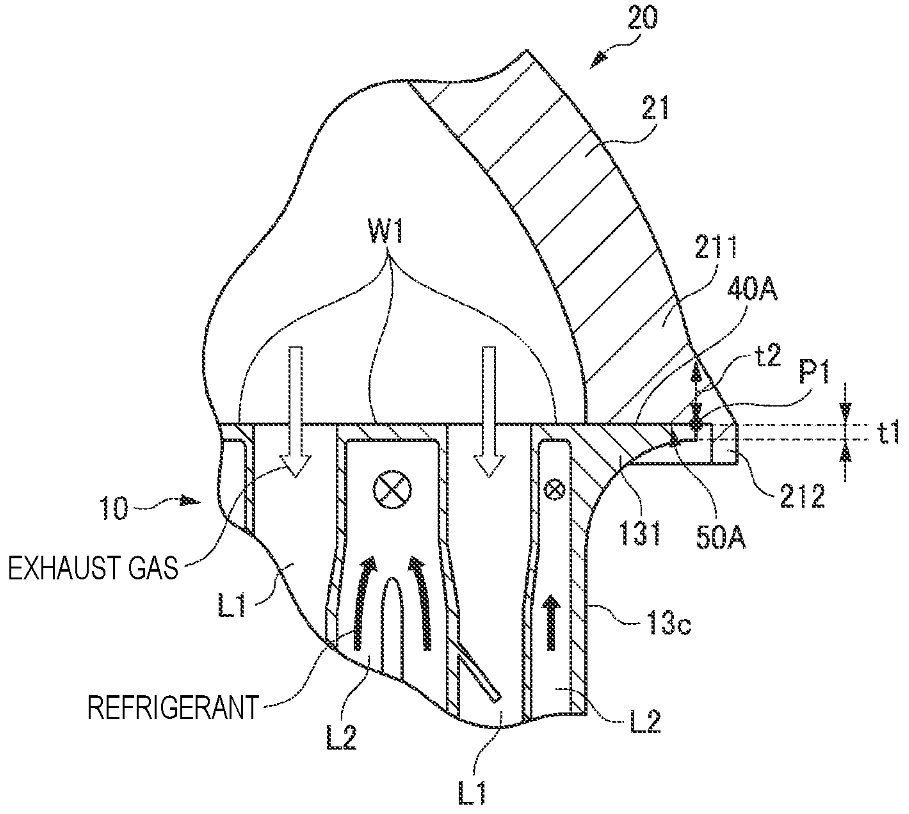
FIG. 10 is an enlarged cross-sectional view of a portion Y in FIG. 9, that is, a portion around a connection position between the heat exchange portion 10 and an upstream-side gas pipeline 21.

As illustrated in FIG. 10, the heat exchange portion 10 and the upstream-side gas pipeline 21 are in contact with each other at an outer peripheral edge portion 131 of the heat exchange portion 10 and a connection end portion 211 of the upstream-side gas pipeline 21. The outer peripheral edge portion 131 of the heat exchange portion 10 is formed at an upper end of the heat exchange portion 10 in the lamination direction (the upper-lower direction) along the entire periphery thereof. The outer peripheral edge portion 131 is provided continuously to a side surface of the case tube 13*c* and the upstream end plate W1, and extends toward the outside of the heat exchange portion 10 in a direction orthogonal to the side surface of the heat exchange portion 10 (the case tube 13*c*). The connection end portion 211 of the upstream-side gas pipeline 21 is a portion connected to the heat exchange portion 10. An upper surface of the outer peripheral edge portion 131 of the heat exchange portion 10 and a lower surface of the connection end portion 211 of the upstream-side gas pipeline 21 are in contact with each other, and a contact surface thereof serves as the contact portion 40A for the heat exchange portion 10 and the upstream-side gas pipeline 21.

Further, the heat exchange portion 10 and the upstream-side gas pipeline 21 are fixed by the fixing portion 50A. The fixing portion 50A is located at the same position as the contact portion 40A. Specifically, the fixing portion 50A is formed of a brazing material, and for example, a sheet-shaped brazing material is arranged on the entire surface of the contact portion 40A and is heated in a vacuum furnace, thereby appropriately fixing the heat exchange portion 10 and the upstream-side gas pipeline 21. Accordingly, the strength and sealability of the fixing portion 50A are secured. A paste brazing material instead of the sheet-like brazing material may be applied to the contact portion 40A and be heated in the vacuum furnace, thereby appropriately fixing the heat exchange portion 10 and the upstream-side gas pipeline 21.

As described above, the upstream-side gas pipeline 21, which is a non-additive manufacturing model, is assembled to the heat exchange portion 10, which is an additive manufacturing model, along the lamination direction of the heat exchange portion 10.

Here, structures of the heat exchange portion 10 and the upstream-side gas pipeline 21 at the contact portion 40A and the vicinity thereof will be described in more detail.

As illustrated in FIG. 10, at the contact portion 40A with which the heat exchange portion 10 and the upstream-side gas pipeline 21 are in contact, a thickness of the heat exchange portion 10 is formed to be smaller than a thickness of the upstream-side gas pipeline 21. The "thickness" here is defined as a minimum thickness in a direction orthogonal to the contact portion 40A (in the example of FIG. 10, an upper-lower direction on the paper). Specifically, in the present embodiment, the thickness of the heat exchange portion 10 at the contact portion 40A is minimum at an outermost position P1 of the contact portion 40A in the direction orthogonal to the contact portion 40A. This minimum thickness is set to t1. On the other hand, the thickness of the upstream-side gas pipeline 21 at the contact portion 40A is minimum at the outermost position P1 of the contact portion 40A in the direction orthogonal to the contact portion 40A. This minimum thickness is set to t2. In the present embodiment, at the contact portion 40A, the thickness t1 of the heat exchange portion 10 is smaller than the thickness t2 of the upstream-side gas pipeline 21.

By setting the thickness t1 of the heat exchange portion 10, which is an additive manufacturing model, thinner than the thickness t2 of the upstream-side gas pipeline 21, which is a non-additive manufacturing model, at the contact portion 40A with which the heat exchange portion 10 and the upstream-side gas pipeline 21 are in contact, it is possible to reduce the manufacturing cost of the heat exchanger T while enjoying the advantages of additive manufacturing. That is, while the heat exchange portion 10 which is required to be fine and is made thin is formed by additive manufacturing, the upstream-side gas pipeline 21 which is not required to be fine and is not made thin is formed by a method different from additive manufacturing. By appropriately separating the heat exchanger T into the component which is an additive manufacturing model and the component which is a non-additive manufacturing model in this manner, the heat exchange performance of the heat exchanger T can be improved by additive manufacturing, and the manufacturing cost of the heat exchanger T can be reduced as compared to a case where the heat exchanger T is manufactured by additive manufacturing in its entirety.

Further, as described above, the contact portion 40A and the fixing portion 50A for the heat exchange portion 10 and the upstream-side gas pipeline 21 are provided at the same position, and the contact portion 40A for the heat exchange portion 10 and the upstream-side gas pipeline 21 constitutes the fixing portion 50A. By providing the fixing portion 50A at the same position as the contact portion 40A, it is not necessary to form a new region for fixing the heat exchange portion 10 and the upstream-side gas pipeline 21 by additive manufacturing. Accordingly, it is possible to reduce the manufacturing time and the manufacturing cost of the heat exchange portion 10 which is an additive manufacturing model.

Further, a positioning protrusion 212 that regulates a relative position with the heat exchange portion 10 is provided in the upstream-side gas pipeline 21. More specifically, the positioning protrusion 212 is provided at the connection end portion 211 of the upstream-side gas pipeline 21. The positioning protrusion 212 is provided at an outer side than the contact portion 40A in the direction orthogonal to the side surface of the heat exchange portion 10 (the case tube 13*c*), and protrudes toward a heat exchange portion 10 side (that is, the lower side) from the contact portion 40A in the upper-lower direction. Further, the positioning protrusion 212 is provided along the entire periphery of the connection end portion 211 of the upstream-side gas pipeline 21. That is, the positioning protrusion 212 is provided to surround the contact portion 40A.

According to such a positioning protrusion 212, the upstream-side gas pipeline 21 is fitted into an end portion of the heat exchange portion 10 in the lamination direction, and the positioning of the heat exchange portion 10 and the upstream-side gas pipeline 21 can be performed with high accuracy.

In addition, by providing the positioning protrusion 212 in the upstream-side gas pipeline 21 which is a non-additive manufacturing model, it is possible to reduce the manufacturing cost of the heat exchanger T as compared with a case where the positioning protrusion 212 is provided in the heat exchange portion 10 which is an additive manufacturing model. In particular, when the positioning protrusion 212 provided to surround the contact portion 40A is provided in the heat exchange portion 10, the heat exchange portion 10 is increased in size, and the manufacturing time and the manufacturing cost of the heat exchange portion 10 are increased. However, when the positioning protrusion 212 is provided in the upstream-side gas pipeline 21 which is a non-additive manufacturing model, the increase in size of the heat exchange portion 10 which is an additive manufacturing model can be avoided, and the manufacturing time and the manufacturing cost of the heat exchange portion 10 can be reduced.

By the way, when a volume of a solid portion of the upstream-side gas pipeline 21 is compared with a volume of a solid portion of the heat exchange portion 10, since the partition wall W constituting the heat exchange portion 10 is fine and thin, the volume of the heat exchange portion 10 is smaller than the volume of the upstream-side gas pipeline 21. Since the upstream-side gas pipeline 21 having a large volume is not formed by additive manufacturing, the manufacturing cost of the heat exchanger T can be reduced.

Next, the contact portion 40B and the fixing portion 50B for the heat exchange portion 10 and the refrigerant pipeline 30 (the refrigerant inflow pipeline 31 and the refrigerant outflow pipeline 32) will be described with reference to FIGS. 12 and 13. A contact portion and a fixing portion for the heat exchange portion 10 and the refrigerant outflow pipeline 32 have structures similar to those of the contact portion 40B and the fixing portion 50B for the heat exchange portion 10 and the refrigerant inflow pipeline 31, and therefore, hereinafter, only structures of the contact portion 40B and the fixing portion 50B for the heat exchange portion 10 and the refrigerant inflow pipeline 31 will be described.

Figure 13:
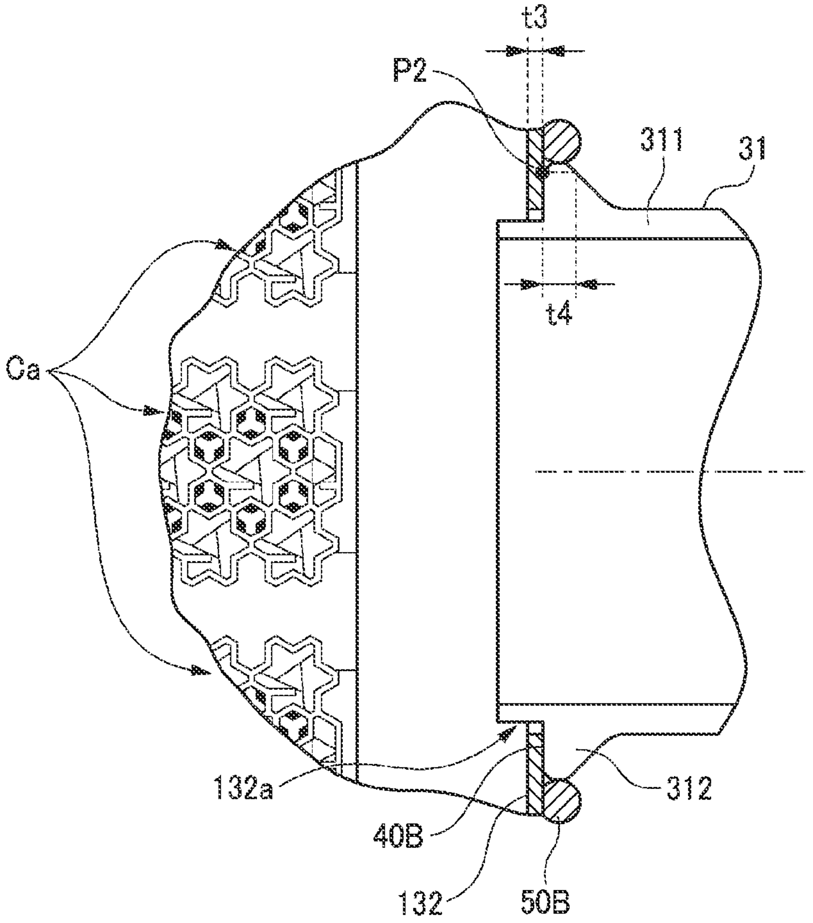
FIG. 13 is an enlarged cross-sectional view of a portion Z in FIG. 12, that is, a portion around a connection position between the heat exchange portion 10 and a refrigerant inflow pipeline 31.

As illustrated in FIGS. 2, 3, 12, and 13, the heat exchange portion 10 and the refrigerant inflow pipeline 31 are in contact with each other at the refrigerant pipeline attaching wall 132 of the heat exchange portion 10 and the flange portion 312 of the refrigerant inflow pipeline 31. More specifically, as illustrated in FIGS. 12 and 13, the refrigerant inflow pipeline 31 includes a cylindrical portion 311 that allows the refrigerant to flow therethrough, and a flange portion 312 that protrudes from the cylindrical portion 311 to an outer peripheral side. The flange portion 312 is provided at a short distance from an end portion of the cylindrical portion 311 on the heat exchange portion 10 side. An opening 132*a* into which the cylindrical portion 311 is inserted is provided in a part of the refrigerant pipeline attaching wall 132, and the cylindrical portion 311 is inserted into the opening 132*a* from the end portion on the heat exchange portion 10 side. As described above, the refrigerant inflow pipeline 31 can be assembled to the heat exchange portion 10 by inserting the cylindrical portion 311 of the refrigerant inflow pipeline 31 into the opening 132*a* of the heat exchange portion 10. The size of the opening 132*a* is the same as or slightly larger than a diameter of the cylindrical portion 311, but is smaller than a diameter of the flange portion 312. Thus, when the cylindrical portion 311 is inserted into the opening 132*a*, the flange portion 312 is in contact with a peripheral portion of the opening 132*a*. A contact surface between the flange portion 312 and the refrigerant pipeline attaching wall 132 serves as the contact portion 40B for the refrigerant inflow pipeline 31 and the heat exchange portion 10.

Similarly to the positioning protrusion 212 of the upstream-side gas pipeline 21, the flange portion 312 of the refrigerant inflow pipeline 31 functions as a positioning protrusion that regulates a relative position with the heat exchange portion 10. The flange portion 312 can increase an accuracy in positioning of the heat exchange portion 10 and the refrigerant inflow pipeline 31 in an insertion direction. Further, by providing the flange portion 312 that functions as a positioning protrusion in the refrigerant inflow pipeline 31 which is a non-additive manufacturing model, it is possible to reduce the manufacturing cost of the heat exchanger T as compared with a case where the flange portion 312 is provided in the heat exchange portion 10 which is an additive manufacturing model.

In addition, the heat exchange portion 10 and the refrigerant inflow pipeline 31 are fixed by the fixing portion 50B. The fixing portion 50B is located at a position different from the contact portion 40B. Specifically, the fixing portion 50B is formed of a brazing material, and the heat exchange portion 10 and the refrigerant inflow pipeline 31 are fixed by applying a paste brazing material to a peripheral portion of the contact portion 40B. As described above, the heat exchange portion 10 and the refrigerant inflow pipeline 31 are assembled. Further, in order to maintain a state where the heat exchange portion 10 and the refrigerant inflow pipeline 31 are in contact with each other before the paste brazing material is applied to the peripheral portion of the contact portion 40B, the two components may be temporarily fixed by, for example, spot welding. The fixing portion 50B for the heat exchange portion 10 and the refrigerant inflow pipeline 31 may be provided at the same position as the contact portion 40B.

By the way, since the upstream-side gas pipeline 21 is a member heavier than the refrigerant inflow pipeline 31, as described above, the upstream-side gas pipeline 21 is fitted into the entire periphery (that is, the outer peripheral edge portion 131) of the heat exchange portion 10 from the lamination direction (the upper-lower direction), thereby performing accurate positioning and fixing. On the other hand, since the refrigerant inflow pipeline 31 is lighter than the upstream-side gas pipeline 21, it is not necessary to position and fix the upstream-side gas pipeline 21 by fitting the upstream-side gas pipeline 21 into the entire periphery of the heat exchange portion 10. That is, as described above, in a direction (a horizontal direction) orthogonal to the lamination direction, the refrigerant inflow pipeline 31 is inserted into the opening 132*a* provided in a part of the heat exchange portion 10, and the flange portion 312 and the heat exchange portion 10 are in contact with each other, and thus the refrigerant inflow pipeline 31 and the heat exchange portion 10 can be accurately positioned and fixed.

Here, the structures of the heat exchange portion 10 and the refrigerant inflow pipeline 31 at the contact portion 40B and the vicinity thereof will be described in more detail.

As illustrated in FIG. 13, at the contact portion 40B with which the heat exchange portion 10 and the refrigerant inflow pipeline 31 are in contact, the thickness of the heat exchange portion 10 is smaller than a thickness of the refrigerant inflow pipeline 31. The "thickness" here is defined as a minimum thickness in a direction orthogonal to the contact portion 40B (in the example of FIG. 13, a left-right direction of the paper). Specifically, the thickness of the heat exchange portion 10 at the contact portion 40B corresponds to a thickness of the refrigerant pipeline attaching wall 132 in the direction orthogonal to the contact portion 40B. The thickness of the refrigerant pipeline attaching wall 132 is constant regardless of a position at the contact portion 40B, that is, the thickness of the heat exchange portion 10 at the contact portion 40B is set to a thickness t3 of the refrigerant pipeline attaching wall 132. On the other hand, the thickness of the refrigerant inflow pipeline 31 at the contact portion 40B is the smallest at an outermost position P2 of the contact portion 40B in the direction orthogonal to the contact portion 40B, and this thickness is set to t4. In the present embodiment, at the contact portion 40B, the thickness t3 of the heat exchange portion 10 is thinner than the thickness t4 of the refrigerant inflow pipeline 31.

By setting the thickness t3 of the heat exchange portion 10, which is an additive manufacturing model, thinner than the thickness t4 of the refrigerant inflow pipeline 31, which is a non-additive manufacturing model, at the contact portion 40B with which the heat exchange portion 10 and the refrigerant inflow pipeline 31 are in contact, it is possible to reduce the manufacturing cost of the heat exchanger T while enjoying the advantages of additive manufacturing. That is, while the heat exchange portion 10 which is required to be fine and is made thin is formed by additive manufacturing, the refrigerant inflow pipeline 31 which is not required to be fine and is not made thin is formed by a method different from additive manufacturing. By appropriately separating the heat exchanger T into the component which is an additive manufacturing model and the component which is a non-additive manufacturing model in this manner, the heat exchange performance of the heat exchanger T can be improved by additive manufacturing, and the manufacturing cost of the heat exchanger T can be reduced as compared to a case where the heat exchanger T is manufactured by additive manufacturing in its entirety.

Further, as described above, the contact portion 40B and the fixing portion 50B for the heat exchange portion 10 and the refrigerant inflow pipeline 31 are provided at different positions, and the peripheral portion of the contact portion 40B for the heat exchange portion 10 and the refrigerant inflow pipeline 31 constitutes the fixing portion 50B. By providing the fixing portion 50B at the peripheral portion of the contact portion 40B, it is not necessary to form a new region for fixing the heat exchange portion 10 and the refrigerant inflow pipeline 31 by additive manufacturing. Accordingly, it is possible to reduce the manufacturing time and the manufacturing cost of the heat exchange portion 10 which is an additive manufacturing model.

Returning to FIGS. 2 and 3, the heat exchange portion 10 and the upstream-side gas pipeline 21 (the downstream-side gas pipeline 22) are assembled along the lamination direction (the upper-lower direction) of the heat exchange portion 10, whereas the heat exchange portion 10 and the refrigerant inflow pipeline 31 (or the refrigerant outflow pipeline 32) are assembled along the direction orthogonal to the lamination direction. When all the components of the heat exchanger T are formed by additive manufacturing, it is necessary to simultaneously form, by additive manufacturing from a lower side during additive manufacturing, a support member (not shown) that supports the refrigerant inflow pipeline 31 extending in the direction orthogonal to the lamination direction from the lower side. The reason why the support member is required is that when the metal powder is laminated and melted from the lower side to the upper side during additive manufacturing, it is difficult to form the refrigerant inflow pipeline 31 from a space where no member is formed without supporting the refrigerant inflow pipeline 31 from the lower side. The support member needs to be manually removed, for example, after the heat exchanger T is manufactured.

In the present embodiment, although the refrigerant inflow pipeline 31 is provided to extend in the direction orthogonal to the lamination direction of the heat exchange portion 10, the refrigerant inflow pipeline 31 is formed by a method different from additive manufacturing and is assembled to the heat exchange portion 10, and thus the support member described above, which is required when the refrigerant inflow pipeline 31 is formed by additive manufacturing, is unnecessary. Therefore, since the formation and removal of the support member are not required, the manufacturing cost can be reduced.

Although an embodiment of the invention has been described above with reference to the accompanying drawings, it is needless to say that the invention is not limited to the embodiment. It is apparent that a person skilled in the art can conceive of various modifications and alterations within the scope described in the claims, and it is understood that such modifications and alterations naturally fall within the technical scope of the invention. In addition, respective constituent elements in the above embodiment may be freely combined without departing from the gist of the invention.

In the embodiment described above, the heat exchanger T, which is an EGR cooler, is given as an example of the additive manufacturing model assembly according to the invention, but the invention is not limited thereto. The additive manufacturing model assembly according to the invention may be a heat exchanger that is not an EGR cooler. Further, the additive manufacturing model assembly may not be a heat exchanger as long as the additive manufacturing model assembly is configured by assembling the additive manufacturing model and the non-additive manufacturing model.

In the embodiment described above, the heat exchanger T is given as an example of the additive manufacturing model assembly, and the configuration in which the heat exchange is performed between the exhaust gas and the refrigerant (the cooling water) is described, but the invention is not limited thereto. The fluid that exchanges heat in the heat exchanger T may be any fluid regardless of a liquid or a gas. For example, in the heat exchanger T, the heat exchange may be performed between liquids, or the heat exchange may be performed between gases.

Further, in the embodiment described above, each of the fixing portions 50A and 50B is formed of a brazing material, but the invention is not limited thereto. Each of the fixing portions 50A and 50B may be formed of, for example, an adhesive instead of the brazing material. When the additive manufacturing model and the non-additive manufacturing model are fixed by welding, the fixing portions 50A and 50B may be welded portions between the additive manufacturing model and the non-additive manufacturing model.

In the present description, at least the following matters are described. In the parentheses, the corresponding constituent elements and the like in the embodiment described above are shown as an example, but the invention is not limited thereto.

(1) An additive manufacturing model assembly (the heat exchanger T) includes:

an additive manufacturing model (the heat exchange portion 10) formed by additive manufacturing in which laminated metal powder is melted; and a metal non-additive manufacturing model (the upstream-side gas pipeline 21, the downstream-side gas pipeline 22, the refrigerant inflow pipeline 31, and the refrigerant outflow pipeline 32) formed by a method different from the additive manufacturing, the additive manufacturing model assembly is configured by assembling the additive manufacturing model and the non-additive manufacturing model, the additive manufacturing model assembly has:

a contact portion (the contact portions 40A and 40B) at which the additive manufacturing model and the non-additive manufacturing model are in contact with each other; and a fixing portion (the fixing portions 50A and 50B) by which the additive manufacturing model and the non-additive manufacturing model are fixed to each other, the fixing portion being located at the same position as the contact portion or a position different from that of the contact portion, in which a thickness of the additive manufacturing model is thinner than a thickness of the non-additive manufacturing model at the contact portion.

According to additive manufacturing technology, a component having a fine and complicated three-dimensional shape can be manufactured, and the improvement in performance of the component can be expected. However, the manufacturing cost may increase as the number of times of lamination increases. On the other hand, although the conventional manufacturing method such as machining or casting is unsuitable for manufacturing the component having a fine and complicated three-dimensional shape, even a component having a large volume can be manufactured at a low cost. According to (1), by making the thickness of the additive manufacturing model thinner than the thickness of the non-additive manufacturing model at the contact portion with which the two components are in contact, the additive manufacturing model assembly can be manufactured at a low cost while enjoying the advantages of additive manufacturing technology. That is, while the component which is required to be fine and is made thin is formed by additive manufacturing, the component which is not required to be fine and is not made thin is formed by a method different from additive manufacturing. By appropriately separating the additive manufacturing model assembly into the component which is an additive manufacturing model and the component which is a non-additive manufacturing model in this manner, the performance of the additive manufacturing model assembly can be improved by additive manufacturing, and the manufacturing cost of the additive manufacturing model assembly can be reduced as compared to the case where the additive manufacturing model assembly is manufactured by additive manufacturing in its entirety.

(2) The additive manufacturing model assembly according to (1), in which a volume of the additive manufacturing model (the heat exchange portion 10) is smaller than a volume of the non-additive manufacturing model (the upstream-side gas pipeline 21, and the downstream-side gas pipeline 22).

According to (2), the manufacturing cost of the additive manufacturing model assembly can be reduced by making the volume of the additive manufacturing model smaller than the volume of the non-additive manufacturing model.

(3) The additive manufacturing model assembly according to (1), in which the contact portion (the contact portion 40A) and the fixing portion (the fixing portion 50A) are provided at the same position, and the contact portion used for the additive manufacturing model and the non-additive manufacturing model serves as the fixing portion.

According to (3), by providing the fixing portion at the same position as the contact portion, it is not necessary to form a new region for the fixing portion by additive manufacturing, and it is possible to reduce the manufacturing time and the manufacturing cost of the additive manufacturing model.

(4) The additive manufacturing model assembly according to (1), in which the contact portion (the contact portion 40B) and the fixing portion (the fixing portion 50B) are provided at different positions, and the fixing portion is formed at a peripheral portion of the contact portion used for the additive manufacturing model and the non-additive manufacturing model.

According to (4), by providing the fixing portion at the peripheral portion of the contact portion, it is not necessary to form the new region for the fixing portion by additive manufacturing, and it is possible to reduce the manufacturing time and the manufacturing cost of the additive manufacturing model.

(5) The additive manufacturing model assembly according to (1), in which the non-additive manufacturing model includes a positioning protrusion (the positioning protrusion 212, and the flange portion 312) that regulates a relative position with the additive manufacturing model.

According to (5), the manufacturing cost of the additive manufacturing model assembly can be reduced by providing the positioning protrusion necessary for the positioning in the non-additive manufacturing model.

(6) The additive manufacturing model assembly according to (5), wherein the positioning protrusion (the positioning protrusion 212) of the non-additive manufacturing model (the upstream-side gas pipeline 21, and the downstream-side gas pipeline 22) is provided to surround the contact portion (the contact portion 40A).

According to (6), since the positioning protrusion is provided to surround the contact portion, it is possible to perform the positioning with higher accuracy. Further, when the positioning protrusion provided to surround the contact portion is provided in the additive manufacturing model, the additive manufacturing model is increased in size, and the manufacturing time and the manufacturing cost of the additive manufacturing model are increased. However, when the positioning protrusion is provided in the non-additive manufacturing model, the increase in size of the additive manufacturing model can be avoided, and the manufacturing time and the manufacturing cost of the additive manufacturing model can be reduced.

(7) The additive manufacturing model assembly according to (5), in which the additive manufacturing model includes an opening (the opening 132*a*), the non-additive manufacturing model (the refrigerant inflow pipeline 31, and the refrigerant outflow pipeline 32) includes a cylindrical portion (the cylindrical portion 311) inserted into the opening, and a flange portion (the flange portion 312) protruding from the cylindrical portion to an outer peripheral side, and the positioning protrusion of the non-additive manufacturing model is the flange portion.

According to (7), the additive manufacturing model and the non-additive manufacturing model can be assembled by inserting the cylindrical portion of the non-additive manufacturing model into the opening of the additive manufacturing model. In addition, the accuracy of the positioning of the additive manufacturing model and the non-additive manufacturing model can be improved by the flange portion of the non-additive manufacturing model.

(8) The additive manufacturing model assembly according to (1), in which the fixing portion is formed of a joining material, or is a welded portion between the additive manufacturing model and the non-additive manufacturing model.

According to (8), the additive manufacturing model and the non-additive manufacturing model can be appropriately fixed by the joining material or welding.

(9) The additive manufacturing model assembly according to (8), in which the fixing portion is formed of a brazing material.

According to (9), the additive manufacturing model and the non-additive manufacturing model can be appropriately fixed by the brazing material.

(10) The additive manufacturing model assembly according to any one of (1) to (9), in which the non-additive manufacturing model includes a first member (the upstream-side gas pipeline 21, and the downstream-side gas pipeline 22) configured to introduce a first fluid (the exhaust gas) into the additive manufacturing model, and a second member (the refrigerant inflow pipeline 31, and the refrigerant outflow pipeline 32) configured to introduce a second fluid (the refrigerant) different from the first fluid into the additive manufacturing model, and the additive manufacturing model includes a heat exchange portion (the heat exchange portion 10) that exchanges heat between the first fluid and the second fluid.

According to (10), since the additive manufacturing model is a heat exchange portion, the heat exchange portion can have a structure having high heat exchange performance by using additive manufacturing technology. On the other hand, since the first member and the second member each of which introduces the fluid into the heat exchange portion are non-additive manufacturing models, the manufacturing cost of the additive manufacturing model assembly can be reduced as compared to the case where the additive manufacturing model assembly is manufactured by additive manufacturing in its entirety.

(11) The additive manufacturing model assembly according to (10), in which the first member is assembled to the additive manufacturing model along a lamination direction of the additive manufacturing model, and the second member is assembled to the additive manufacturing model along a direction orthogonal to the lamination direction.

When all of the first member, the second member, and the heat exchange portion are formed by additive manufacturing, a support member for supporting the second member from the lower side is necessary in order to form the second member provided in the direction orthogonal to the lamination direction during additive manufacturing. Since the second member is a non-additive manufacturing model, the second member can be assembled to the heat exchange portion along the direction orthogonal to the lamination direction as in (11) without providing a support member.

REFERENCE SIGNS LIST

10: heat exchange portion (additive manufacturing model)
132*a*: opening
21: upstream-side gas pipeline (non-additive manufacturing model, first member)
212: positioning protrusion
22: downstream-side gas pipeline (non-additive manufacturing model, first member)
31: refrigerant inflow pipeline (non-additive manufacturing model, second member)
311: cylindrical portion
312: flange portion (flange portion, positioning protrusion)
32: refrigerant outflow pipeline (non-additive manufacturing model, second member)
40A, 40B: contact portion
50A, 50B: fixing portion
T: heat exchanger (additive manufacturing model assembly)

What is claimed is:

1. A heat exchanger comprising:

an additive manufacturing model formed by additive manufacturing in which laminated metal powder is melted; and a metal non-additive manufacturing model formed by a method different from the additive manufacturing, wherein the heat exchanger is configured by assembling the additive manufacturing model and the non-additive manufacturing model, the heat exchanger has:

a contact portion at which the additive manufacturing model and the non-additive manufacturing model are in contact with each other; and a fixing portion by which the additive manufacturing model and the non-additive manufacturing model are fixed to each other, the fixing portion being located at a same position as the contact portion or a position different from the contact portion, at the contact portion, a minimum thickness of the additive manufacturing model in a direction orthogonal to the contact portion is thinner than a minimum thickness of the non-additive manufacturing model in the direction orthogonal to the contact portion, the non-additive manufacturing model comprises a first member configured to introduce a first fluid into the additive manufacturing model, and a second member configured to introduce a second fluid different from the first fluid into the additive manufacturing model, the additive manufacturing model comprises a heat exchange portion that exchanges heat between the first fluid and the second fluid, the first member is assembled to the additive manufacturing model along a lamination direction of the additive manufacturing model, and the second member is assembled to the additive manufacturing model along a direction orthogonal to the lamination direction.

2. The heat exchanger according to claim 1, wherein a volume of a solid portion of the additive manufacturing model excluding a flow path portion is smaller than a volume of a solid portion of the non-additive manufacturing model excluding a flow path portion.

3. The heat exchanger according to claim 2, wherein the non-additive manufacturing model comprises a first member configured to introduce a first fluid into the additive manufacturing model, and a second member configured to introduce a second fluid different from the first fluid into the additive manufacturing model, and the additive manufacturing model comprises a heat exchange portion that exchanges heat between the first fluid and the second fluid.

4. The heat exchanger according to claim 3, wherein the first member is assembled to the additive manufacturing model along a lamination direction of the additive manufacturing model, and the second member is assembled to the additive manufacturing model along a direction orthogonal to the lamination direction.

5. The heat exchanger according to claim 1, wherein the contact portion and the fixing portion are provided at the same position, and the contact portion at which the additive manufacturing model and the non-additive manufacturing model are in contact with each other serves as the fixing portion.

6. The heat exchanger according to claim 5, wherein the non-additive manufacturing model comprises a first member configured to introduce a first fluid into the additive manufacturing model, and a second member configured to introduce a second fluid different from the first fluid into the additive manufacturing model, and the additive manufacturing model comprises a heat exchange portion that exchanges heat between the first fluid and the second fluid.

7. The heat exchanger according to claim 1, wherein the contact portion and the fixing portion are provided at different positions, and the fixing portion is provided at a peripheral portion of the contact portion at which the additive manufacturing model and the non-additive manufacturing model are in contact with each other.

8. The heat exchanger according to claim 7, wherein the non-additive manufacturing model comprises a first member configured to introduce a first fluid into the additive manufacturing model, and a second member configured to introduce a second fluid different from the first fluid into the additive manufacturing model, and the additive manufacturing model comprises a heat exchange portion that exchanges heat between the first fluid and the second fluid.

9. The heat exchanger according to claim 1, wherein the non-additive manufacturing model includes a positioning protrusion that regulates a relative position with the additive manufacturing model.

10. The assembly heat exchanger according to claim 9, wherein the positioning protrusion of the non-additive manufacturing model is provided to surround the contact portion.

11. The heat exchanger according to claim 10, wherein the non-additive manufacturing model comprises a first member configured to introduce a first fluid into the additive manufacturing model, and a second member configured to introduce a second fluid different from the first fluid into the additive manufacturing model, and the additive manufacturing model comprises a heat exchange portion that exchanges heat between the first fluid and the second fluid.

12. The heat exchanger according to claim 5, wherein the additive manufacturing model includes an opening, the non-additive manufacturing model includes a cylindrical portion inserted into the opening, and a flange portion protruding from the cylindrical portion to an outer peripheral side of the cylindrical portion, and the positioning protrusion of the non-additive manufacturing model is the flange portion.

13. The heat exchanger according to claim 12, wherein the non-additive manufacturing model comprises a first member configured to introduce a first fluid into the additive manufacturing model, and a second member configured to introduce a second fluid different from the first fluid into the additive manufacturing model, and the additive manufacturing model comprises a heat exchange portion that exchanges heat between the first fluid and the second fluid.

14. The heat exchanger according to claim 9, wherein the non-additive manufacturing model comprises a first member configured to introduce a first fluid into the additive manufacturing model, and a second member configured to introduce a second fluid different from the first fluid into the additive manufacturing model, and the additive manufacturing model comprises a heat exchange portion that exchanges heat between the first fluid and the second fluid.

15. The heat exchanger according to claim 1, wherein the fixing portion is formed by a joining material, or is a welded portion between the additive manufacturing model and the non-additive manufacturing model.

16. The heat exchanger according to claim 15, wherein the fixing portion is formed by a brazing material.

17. The heat exchanger according to claim 16, wherein the non-additive manufacturing model comprises a first member configured to introduce a first fluid into the additive manufacturing model, and a second member configured to introduce a second fluid different from the first fluid into the additive manufacturing model, and the additive manufacturing model comprises a heat exchange portion that exchanges heat between the first fluid and the second fluid.

18. The heat exchanger according to claim 15, wherein the non-additive manufacturing model comprises a first member configured to introduce a first fluid into the additive manufacturing model, and a second member configured to introduce a second fluid different from the first fluid into the additive manufacturing model, and the additive manufacturing model comprises a heat exchange portion that exchanges heat between the first fluid and the second fluid.

* * * * *